United States Patent
Raber et al.

(10) Patent No.: US 11,816,203 B2
(45) Date of Patent: Nov. 14, 2023

(54) STACK EXECUTION DETECTION IN A SANDBOX ENVIRONMENT

(71) Applicant: Malwarebytes Inc., Santa Clara, CA (US)

(72) Inventors: Jason Neal Raber, Bellbrook, OH (US); Mickael Roger, Six-Fours-les-Plages (FR)

(73) Assignee: Malwarebytes Inc., Santa Clara, CA (US)

(*) Notice: Subject to any disclaimer, the term of this patent is extended or adjusted under 35 U.S.C. 154(b) by 0 days.

(21) Appl. No.: 17/456,257

(22) Filed: Nov. 23, 2021

(65) Prior Publication Data

US 2023/0161866 A1  May 25, 2023

(51) Int. Cl.
| | |
|---|---|
| *G06F 21/53* | (2013.01) |
| *G06F 9/455* | (2018.01) |
| *G06F 11/34* | (2006.01) |
| *G06F 11/30* | (2006.01) |

(52) U.S. Cl.
CPC .......... *G06F 21/53* (2013.01); *G06F 9/45508* (2013.01); *G06F 11/302* (2013.01); *G06F 11/3495* (2013.01); *G06F 2221/033* (2013.01)

(58) Field of Classification Search
CPC .... G06F 21/53; G06F 9/45508; G06F 11/302; G06F 11/2495; G06F 2221/033
USPC .......................................................... 726/22
See application file for complete search history.

(56) References Cited

U.S. PATENT DOCUMENTS

| | | | |
|---|---|---|---|
| 2007/0300012 A1* | 12/2007 | Yip ...................... | G06F 12/0811 711/113 |
| 2008/0126740 A1* | 5/2008 | Wrighton ................. | G06F 9/52 711/E12.066 |
| 2010/0153926 A1* | 6/2010 | Ben-Yehuda ....... | G06F 11/3676 717/127 |
| 2016/0110542 A1* | 4/2016 | Shanbhogue ....... | G06F 9/30134 726/22 |
| 2016/0283716 A1* | 9/2016 | Momot ................. | G06F 21/566 |
| 2016/0364341 A1* | 12/2016 | Banginwar ......... | G06F 9/45558 |
| 2017/0142156 A1* | 5/2017 | Shiraishi ................ | G06F 21/52 |
| 2018/0095902 A1* | 4/2018 | Lemay .................... | G06F 21/53 |
| 2021/0150020 A1* | 5/2021 | Lewis ................. | H04L 67/2842 |

* cited by examiner

*Primary Examiner* — Chat C Do
*Assistant Examiner* — Bradford F Wheaton
(74) *Attorney, Agent, or Firm* — Fenwick & West LLP (57) ABSTRACT

An anti-malware system monitors the emulation of a suspicious program in a sandbox environment. The anti-malware system determines that the suspicious program is attempting to access a restricted area of memory (e.g., an executable instruction in the restricted area). Rather than stop the emulation, the anti-malware system can temporarily pause the emulation of the suspicious program. During this pause, the anti-malware system can determine whether the suspicious program is containable within the sandbox environment. If the anti-malware system determines that the emulation of the executable instruction is safe (e.g., that the program is containable), the anti-malware system will resume emulation. If the anti-malware system determines that the emulation of the executable instruction is not safe, the anti-malware system may shut down emulation.

20 Claims, 3 Drawing Sheets

STACK EXECUTION DETECTION IN A SANDBOX ENVIRONMENT

FIELD OF ART

The present disclosure generally relates to malware sandboxing and, more specifically, to monitoring a suspicious program as the suspicious program attempts to access a restricted area of memory.

BACKGROUND

Anti-malware systems use a sandbox to emulate execution of a suspicious computer program in a secure and isolated computing environment. Containing the suspicious computer program in the sandbox, an anti-malware system can monitor the program's behavior and prevent malicious programs from executing in the native environment where it can access the rest of the computer system. However, suspicious programs are often developed to evade detection of anti-malware systems, including causing the emulation to shut down before the anti-malware systems can monitor more of the suspicious programs' behavior. In particular, suspicious programs can take advantage of executing from stack memory to trigger conventional anti-malware systems to shut down emulation.

Most software applications use stack memory to store data (i.e., not code) and return addresses. Conventional anti-malware systems will stop emulating a suspicious computer program when the program executes code from stack memory. While innocent programs may accidentally store code in stack memory, a malware program can intentionally store code in stack memory to avoid letting an anti-malware system learn about the malware program. When emulated within a conventional sandbox environment, a malware program will trigger the emulation to stop when the sandbox detects that code is being executed from the stack. After emulation stops, the anti-malware system does not learn any further information about how the malware program operates. The malware program can continue attempts to infiltrate computing systems that do not know enough about the program to defend against it.

SUMMARY

An anti-malware system described herein increases the amount of information learned about suspicious programs by continuing the emulation of a suspicious program rather than completely stopping emulation after detecting code in the stack memory. In particular, the anti-malware system determines to continue emulation of a suspicious program after determining that the suspicious program can be contained within a sandbox environment. If the anti-malware system determines that the suspicious program cannot be contained within the sandbox environment, the system shuts down emulation. By continuing emulation, the anti-malware system can determine whether the suspicious program was an innocent program that had added code to the stack memory for benign reasons or malware. Continued emulation may also enable the anti-malware system to learn more about how the suspicious program operates. Thus, the anti-malware system improves the security of computing devices over conventional anti-malware systems.

In one example embodiment, the anti-malware system monitors the emulation of a suspicious program in a sandbox environment (e.g., by monitoring the progression of an instruction pointer as the suspicious program code is executed). If the anti-malware system determines that the suspicious program is attempting to access a restricted area of memory (e.g., an executable instruction in the restricted area), the anti-malware system can temporarily pause the emulation of the suspicious program rather than end emulation immediately. During this pause, the anti-malware system can determine whether it is safe to continue emulation (e.g., if the suspicious program is containable within the sandbox environment upon emulating the executable instruction). For example, if the anti-malware system determines that the suspicious program is containable, the anti-malware system resumes emulation. The anti-malware system, further improves upon conventional systems by conserving the emulation context after pausing emulation. For example, by saving the state of memory before analyzing the suspicious program's code, the anti-malware system can perform the analysis (e.g., disassemble bytes of the suspicious program's code and determine that the suspicious program can be contained within the sandbox) and resume emulation using the state of emulation before the analysis. Thus, the anti-malware system enables the analysis of suspicious programs during the pause in emulation and can resume emulation as though the pause had not occurred. If the anti-malware system determines that the system cannot safely resume emulation of the program (e.g., determining that the program is not containable), the anti-malware system may shut down emulation.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
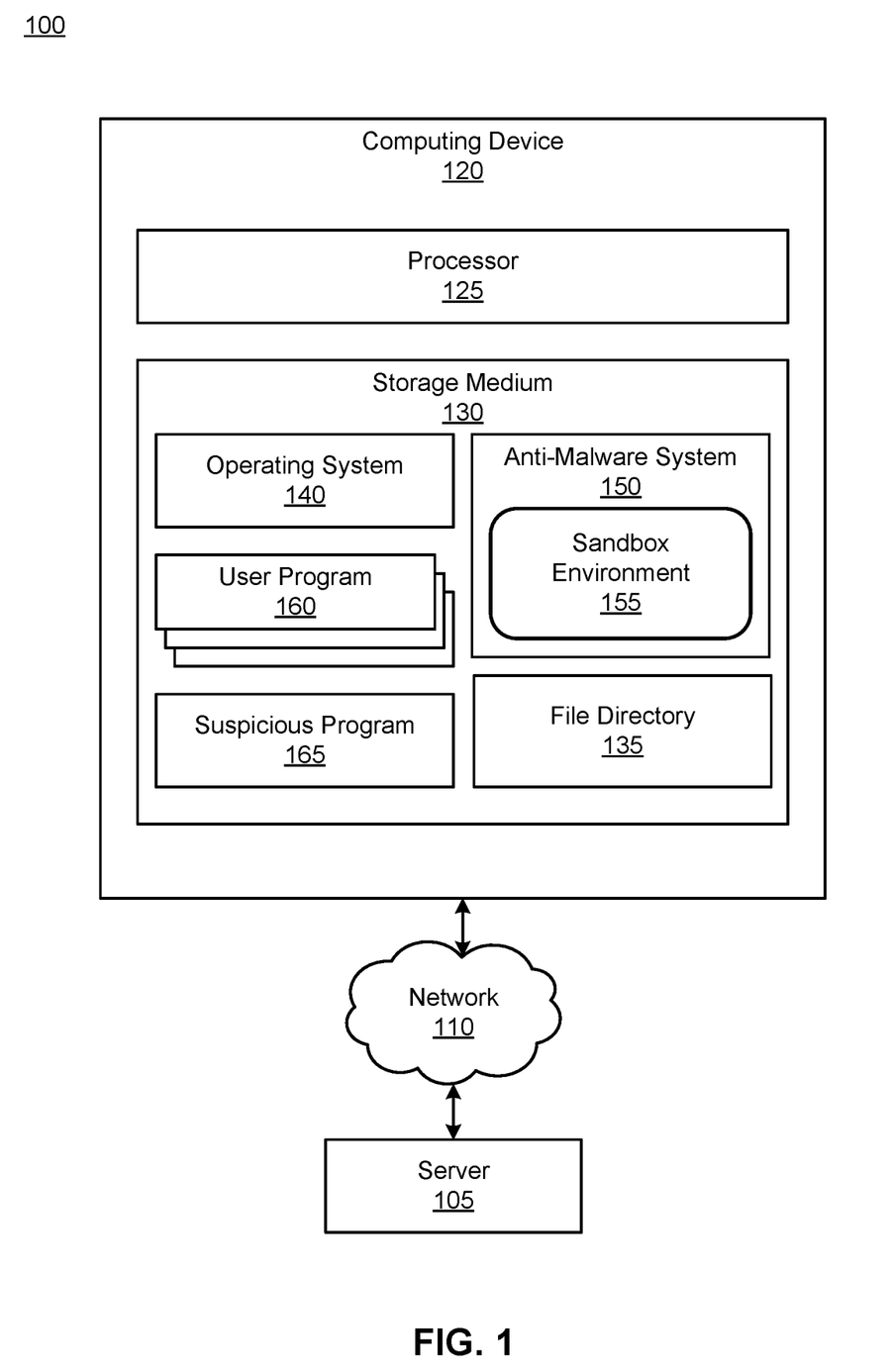
FIG. 1 is a system diagram illustrating an example computing device including an anti-malware system, according to an embodiment.

FIG. 1 is a system diagram illustrating an example computing device including an anti-malware application, according to an embodiment. The environment 100 of FIG. 1 includes a server 105, a network 110, and a computing device 120. For simplicity and clarity, only one server 105 and one client computing device 120 is shown in the environment 100. However, other embodiments may include different numbers of servers 105 and computing device 120. The system environment 100 may also include different or additional entities.

The network 110 may serve to communicatively couple remote the computing device 120 and the server 105. In some embodiments, the network 110 includes any combination of local area and/or wide area networks, using wired and/or wireless communication systems. The network 110 may use standard communications technologies and/or protocols. For example, the network 110 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 110 may be encrypted using any suitable technique or techniques.

The server 105 is a computer system configured to store, receive, and transmit data to client devices 120 via the network 110. The server 105 may include a singular computing system, such as a single computer, or a network of computing systems, such as a data center or a distributed computing system. The server 105 may connect with the computing device 120 to receive and send data. For example, the server 105 may send the computing device 120 configuration data for the anti-malware system 150. In some implementations, the anti-malware system 150 extracts and sends data on a suspicious program's files to the server 105 for classification instead of performing detection locally (e.g., at a sandbox environment, similar to the sandbox environment 155, of the server). The server 105 may receive the data, perform analysis and classification and send data and instructions back to the anti-malware system 150 to enable the computing device 120 to identify and stop malicious activities.

A computing device 120 may be a desktop computer, a laptop computer, a smart phone, a tablet computing device, an Internet of Things (IoT) device, or any other device having computing and data communication capabilities. A computing device 120 is capable of processing data and may be capable of transmitting and receiving data via the network 110. In the embodiment of FIG. 1, the computing device 120 includes a processor 125 for manipulating and processing data and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, compact discs and the like. In addition to storing program instructions, the storage medium 130 may store various data associated with operation of the computing device 120 or for use by applications executing on the computing device 120.

In one embodiment, the storage medium 130 comprises a non-transitory computer-readable storage medium that stores a file directory 135 and various executable programs including an operating system 140, an anti-malware system 150, and user programs 160 that are each embodied as computer-executable instructions stored to the non-transitory computer-readable storage medium. The instructions, when executed by the processor 125, cause the computing device 120 to perform the functions attributed to the programs described herein.

In some embodiments, the operating system (OS) 140 is a specialized program that manages computer hardware resources of the computing device 120 and provides common services to the user programs 160. For example, a computer's operating system 140 may manage the processor 125, storage medium 130, or other components such as a graphics adapter, an audio adapter, network connections, disc drives, or USB slots (not illustrated). A cell phone's operating system 140 may manage the processor 125, storage medium 130, display screen, keypad, dialer, wireless network connections and the like. Because many programs and executing processes compete for the limited resources provided by the processor 125, the operating system 140 may manage the processor bandwidth and timing to each requesting process. Examples of operating systems include WINDOWS, MAC OS, IOS, LINUX, UBUNTU, UNIX, and ANDROID.

The set of user programs 160 may include applications for performing a particular set of functions, tasks, or activities for the benefit of the user. For example, the set of user programs 160 installed on a computing device 120 can include word processors, spreadsheet applications, video games, and web browsers. A user of the computing device 120 may manually install the user programs 160, or user programs can be preinstalled, automatically installed, or otherwise added to the computing device in some way. The user programs 160 (depending on the stated purpose/functionality) can have access to sensitive user data, files, or other valuable information stored on the computing device 120.

In some cases, a user program 160 contains hidden malware that will be loaded alongside the user program 160 or when it executes. A suspicious program 165, as used herein, refers to a user program 160, operating system file, or other file that potentially contains malware. Malware contained within a suspicious program 165 may infect the computing device 120 when the suspicious program 165 is loaded, opened, or executed. Often suspicious programs are newly downloaded or installed, but existing user programs 160 or files may be considered suspicious programs by the anti-malware system 150 under some circumstances. In some implementations, an anti-malware system 150 considers newly installed user programs 160 (or programs exhibiting suspicious behavior) to be suspicious programs 165. The anti-malware system 150 may analyze suspicious programs 165 prior to their installation, opening, and/or execution on the computing device 120 to determine if the suspicious program 165 contains malware and should be removed or if the suspicious program is cleared to be installed.

The file directory 135 stores files. Files may include system files associated with operation of the operating system 140, the user programs 160, or the anti-malware system 150. The files may further include user files that may be created or modified by users. Examples of user files may include image files, video files, word processor documents, spreadsheet documents, and drawing files. User files are generally highly valuable to the users because they may be personal in nature and may be difficult or impossible to recover or replace if compromised. As a result, certain types of malware such as ransomware may target user files.

An anti-malware system 150 attempts to detect, stop, and remove malware before it can negatively affect the computing device 120, according to some embodiments. The anti-malware system 150 may prevent new malware from being installed on a computing device 120 or remove or disable existing malware that is already present on the computing device 120 once it is detected by the anti-malware system 150. The anti-malware system 150 may determine if a suspicious program 165 contains malware based on behaviors indicative of malware, static analysis of a file associated with the suspicious program 165, emulation of a program in the sandbox environment 155 described in the description of FIG. 2, or a combination of factors (including some or all of the listed factors). The anti-malware system 150 may use malware definitions that specify characteristics or behaviors of malware that the anti-malware system 150 seeks to detect in suspicious programs 165.

The anti-malware system 150 includes a sandbox environment 155 to contain suspicious programs 165 (e.g., before allowing the suspicious program 165 to install or execute without restricted access to the native environment of the computing device 120). The sandbox environment 155 is an isolated and secure environment that includes an emulator for emulating and monitoring behavior of a suspicious program 165. The sandbox environment prevents the suspicious program 165 being analyzed from affecting the file directory 135 or the computing system 120 outside of the sandbox environment. To this end, the anti-malware system 150 imposes memory access restrictions on the suspicious program 165. In some implementations, the sandbox environment 155 hooks certain functions (such as API functions) of the suspicious program 165 that could potentially contain malware and executes the instructions of the selected functions in its environment (e.g., a virtual environment isolated from the native environment of the operating system 140). As referred to herein, the terms "program instructions," "executable instructions," and "code" may be used interchangeably unless specified otherwise by the context of the description in which the terms are used.

When sandboxing a suspicious program 165, the anti-malware system 150 uses the sandbox environment 155 to control and monitor the resources to which the suspicious program 165 has access. For example, the anti-malware system 150 can control the memory (and other storage space) assigned to or used by the suspicious program 165, limiting the accessible memory to spaces designated for the sandbox environment 155. The anti-malware system 150 can follow the execution of each instruction executed by the suspicious program 165 as it is executed in the sandbox environment 155. In some implementations, the anti-malware system 150 "wraps" the suspicious program 165, intercepting instructions sent by the suspicious program 165 and relaying appropriate responses from the operating system 140 (or the hardware of the computing system 120). The anti-malware system 150 can follow the control flow of a sandboxed suspicious program 165 as it passes sequentially from instruction to instruction. However, to avoid detection from conventional anti-malware systems, a malware program can covertly load code on stack memory. For example, the malware program can disguise an executable instruction as a variable value that an anti-malware system may allow to be stored at the stack. In another example of loading code on stack memory, the malware program may use assembly inline instructions (e.g., using a memcpy function). By accessing the stack memory outside of a sandbox environment, the malware program may freely access a portion of the device's memory that is shared across multiple software applications executed on the computing device. Malware programs have additional motives to upload code to stack memory. In a first example motive, a computing device (e.g., the anti-malware system on the device) will not shut down the malware program because the malware makes the stack executable. The malware program may make the stack executable by disabling the Data Execution Prevention (DEP) or change the stack rights with a simple Windows application programming interface (API) like VirtualProtect. A common motive for malware programs to upload or copy code on the stack can be because often, malware programs encrypt the code. Encryption allows malware programs to hide some malicious code and disturb some conventional anti-virus or malware detection engines. After thwarting these engines, the malware programs can then decrypt the code before executing it.

Figure 2:
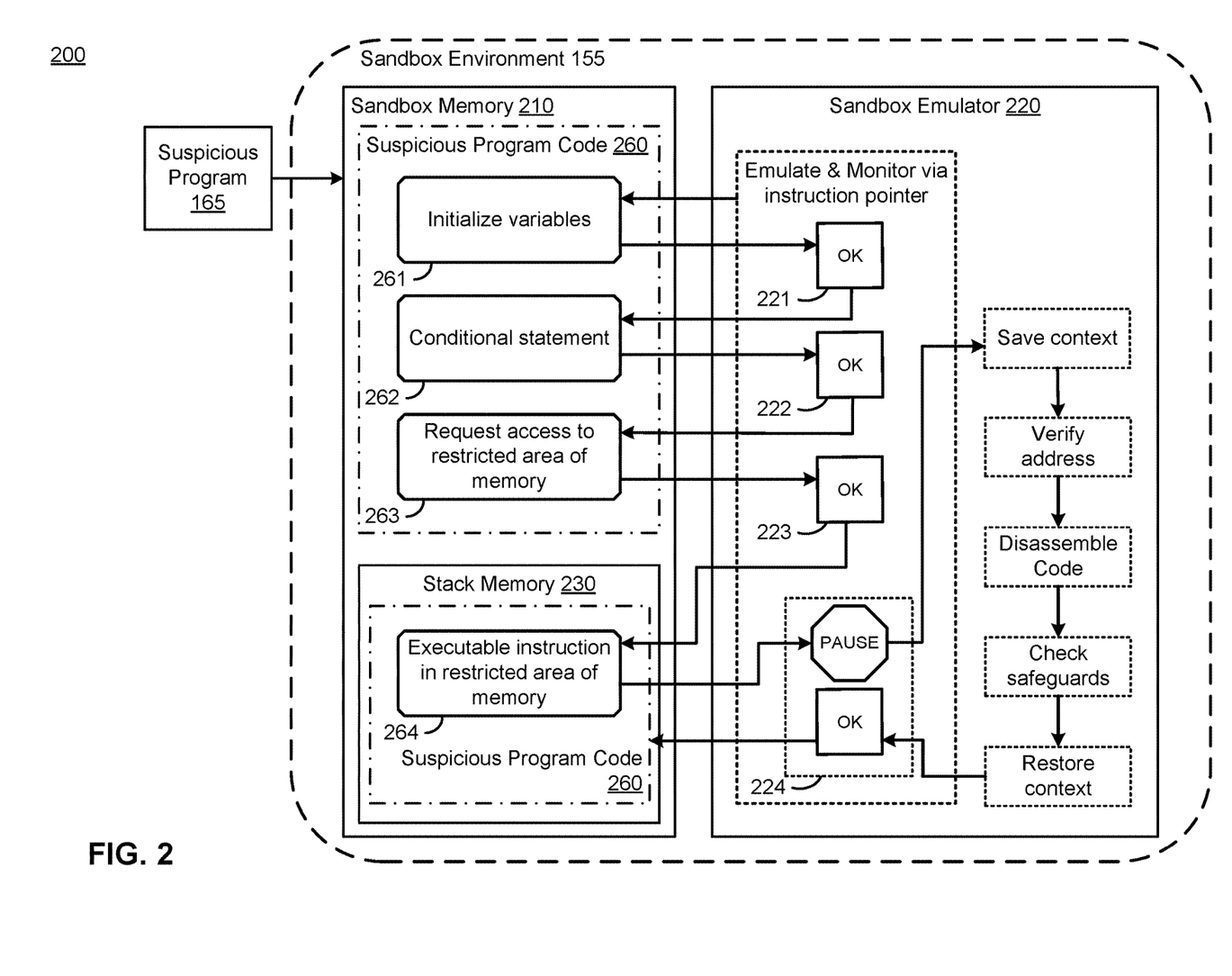
FIG. 2 is a block diagram illustrating an example sandbox environment for emulating a suspicious program, according to an embodiment.

FIG. 2 is a block diagram 200 illustrating an example sandbox environment 155 of FIG. 1. The sandbox environment 155 is included within the anti-malware system 150 and includes a sandbox memory 210, stack memory 230, and a sandbox emulator 220. The computing device 120 tests the suspicious program 165 in the sandbox environment 155 and if the suspicious program 165 is not determined to be malware, the computing device 120 may remove memory access restrictions for the supposedly innocent program to operate outside of the sandbox environment 155. The computing device 120 loads the suspicious program 165 in the memory of the sandbox environment 155 (e.g., in the sandbox memory 210 and/or the stack memory 230). The sandbox emulator 220 facilitates and monitors the emulation of the suspicious program 165 in the sandbox environment 155.

Most software applications use stack memory to store data (i.e., not code) and return addresses. While innocent programs may store code in stack memory, a malware program can intentionally store code in stack memory to avoid detection by an anti-malware system and/or security controls. Conventional anti-malware systems learn about malware programs by emulating the programs in a sandbox environment, but conventional sandbox environments may stop emulating a suspicious program—innocent or malware—if the suspicious program attempts to execute code from stack memory. Malware programs can take advantage of these conventional sandbox environments. For example, a malware program may include executable instructions within variable values stored into the stack memory. Thus, when emulated within a conventional sandbox environment, the malware program will trigger the emulation to stop when the sandbox emulator detects that code is being executed from the stack, and the anti-malware system will not learn any further information about how the malware program operates. That is, the anti-malware system will not learn if the suspicious program was an innocent program that had accidentally included code in the stack memory or if the suspicious program was a malware program and how the malware program operates.

The anti-malware system described herein (e.g., the anti-malware system 150) increases the amount of information learned about suspicious programs by continuing the emulation of a suspicious program rather than completely stopping emulation after detecting code in the stack memory. In particular, the anti-malware system determines to continue emulation of a suspicious program after determining that the suspicious program cannot cause adverse effects to the operation of the computing device 120 (e.g., the suspicious program can be contained within a sandbox environment). If the anti-malware system determines that the suspicious program cannot be contained within the sandbox environment, the system will shut down emulation. By continuing emulation, the anti-malware system can learn if the suspicious program was an innocent program that had accidentally included code in the stack memory or if the suspicious program was a malware program. The anti-malware system may also learn additional information about how the malware program operates.

The anti-malware system 150 uses the sandbox environment 155 to determine how the suspicious program 165 operates and whether it is a malware program or not. The anti-malware system 150 loads the suspicious program 165 in the sandbox memory 210, which includes the stack memory 230, and emulating the suspicious program 165 using the sandbox emulator 220. The example depicted in FIG. 2 shows the anti-malware system 150 continuing to emulate the suspicious program 165 despite the suspicious program 165 executing code from the stack memory 230. The anti-malware system 150 loads the suspicious program code 260 into the sandbox memory 210, including at the stack memory 230. The suspicious program code includes instructions 261-264, where the instruction 264 is stored in the stack memory 230. The suspicious program code includes instructions 261-263 that will likely not raise any malware detection flags (e.g., because they are not stored in the stack memory 230). However, the instruction 264 stored in the stack memory 230 may adversely affect the operation of the computing device 120 and cause the anti-malware system 150 to determine whether or not emulation should continue.

The anti-malware system 150 emulates the suspicious program code 260 using the sandbox emulator 220. The sandbox emulator 150 emulates and monitors the suspicious program code 260 as each instruction is being executed by the sandbox emulator 220. In some embodiments, the sandbox emulator 150 can track the executed code by monitoring an instruction pointer. For example, the sandbox emulator 150 can monitor a value of an instruction pointer, where the value indicates an address of a memory register storing an instruction of the suspicious program 165 that is currently being emulated by the sandbox emulator 220. At checkpoints 221-224, the sandbox emulator 220 can determine whether the suspicious program 165 is attempting to access a restricted area of memory (e.g., the stack memory 230). At the checkpoints 221-223, the sandbox emulator 220 may determine that the address in memory, as reflected in the value of the instruction pointer, is not an address of the stack memory 230. Accordingly, the sandbox emulator 220 does not pause emulation and proceeds to emulate the instructions 261-263 after the checkpoints 221-223, respectively.

The sandbox emulator 220 can use the instruction pointer to determine that the suspicious program 165 is indeed attempting to access the stack memory 230. At checkpoint 224, the sandbox emulator 220 determines that the value of the instruction pointer is an address at the stack memory 230. Upon determining that the suspicious program 165 has accessed the stack memory 230, the sandbox emulator 220 pauses emulation and determines whether the emulation should continue. After pausing emulation, the sandbox emulator 220 saves off the context of the emulation of the suspicious program 165. The context can include the state of memory, stack, and registers in the sandbox environment 155. This allows the sandbox emulator 220 to restore the context of the emulation when emulation is resumed. Furthermore, by restoring the context, the suspicious program is less likely to identify that it is operating in the sandbox environment 155. In an example where emulation context is not saved, an unexpected change in a register value may tip off one of the mechanisms of a malware program that monitors for such cues to determine that the malware program is operating in a sandbox rather than a memory space of the computing device that is less restricted.

After saving the context of the emulation, the sandbox emulator 220 may determine whether the address that was requested in instruction 263 and where the instruction pointer has landed is a valid memory address. For example, the sandbox emulator 220 may verify the address against a list of addresses that are flagged (e.g., by the operating system 140) as restricted areas of memory. If the address is valid, the sandbox emulator 220 may then determine if the content of the register at the address is an executable instruction (e.g., rather than a data value that may be typical to access in the stack memory 230). To make this determination, the sandbox emulator 220 analyzes the instruction 264 stored in the stack memory 230. In some embodiments, the sandbox emulator 220 may disassemble a portion of bytes of the instruction 264 and determine that the disassembled code has the structure of a particular type of instruction (e.g., an x86 assembly code).

After determining that the instruction 264 is an executable instruction with a valid address, the sandbox emulator 220 may check one or more safeguards to determine that the suspicious program 165 can be safely emulated (e.g., the program is containable within the sandbox environment). The safeguards determine whether the suspicious program 165 will cause an event to occur from which the anti-malware system 150 cannot protect the computing device 120 (e.g., the suspicious program 165 escapes the sandbox environment 155 and begins to have unrestricted access to the memory of the computing device 120). One example safeguard mechanism is the Malwarebytes Anti-Exploit software tool. Upon determining that safeguards are sufficient to contain the suspicious program 165 within the sandbox environment 155, the sandbox emulator 220 restores the context that was previously saved off (e.g., restoring the state of memory, registers, and stack) and resumes the emulation of the suspicious program 165. This resumption in emulation is depicted in FIG. 2 by an arrow from the checkpoint 224 back to the suspicious program code 260, which is pointed to the code 260 within the stack memory 230 but may alternatively point to the code within the sandbox memory 210 outside of the stack memory 230. Conversely, if the sandbox emulator 220 determines that safeguards are not sufficient to contain the suspicious program 165, the sandbox emulator 220 may shut down emulation of the suspicious program 165.

Figure 3:
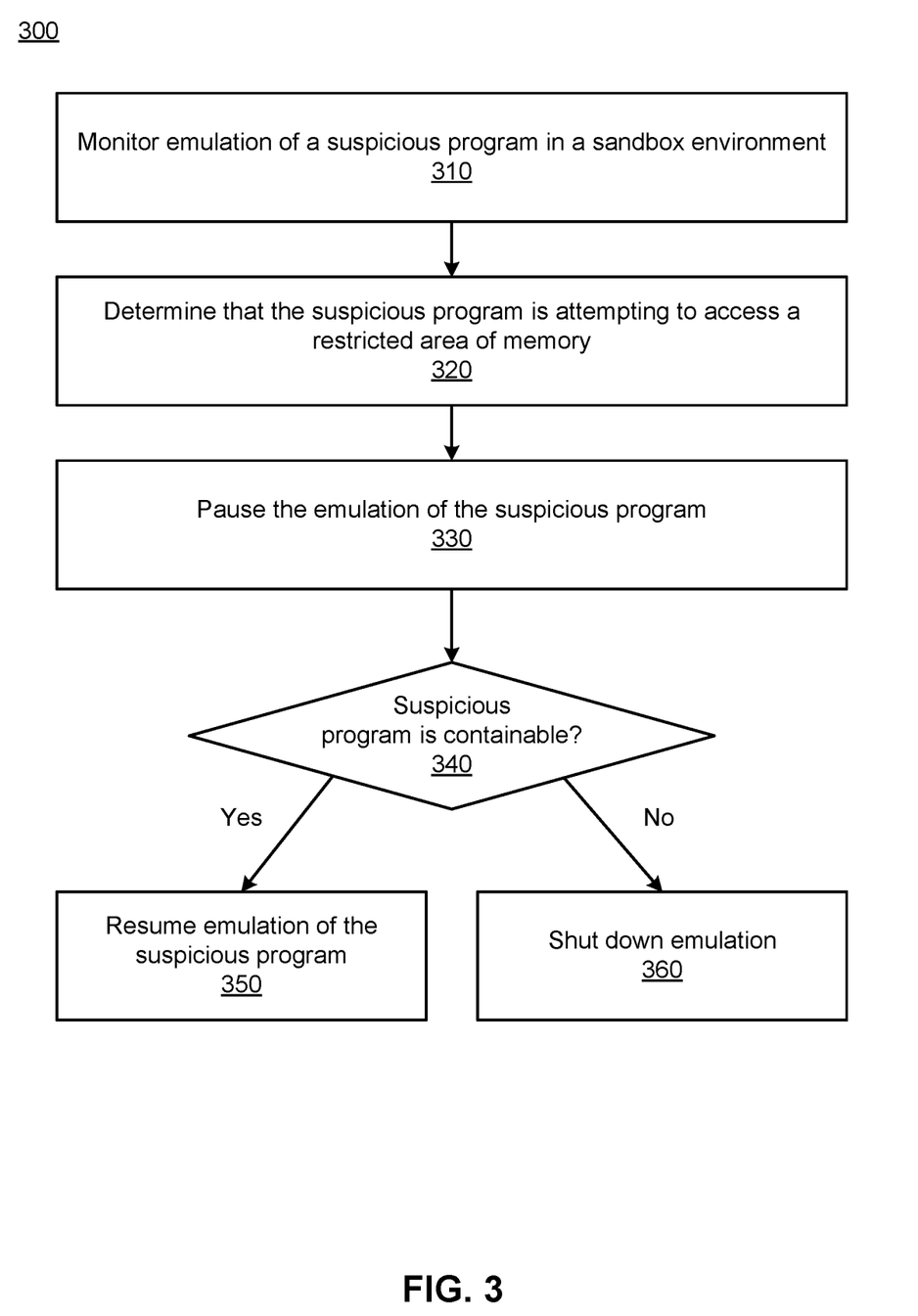
FIG. 3 is a flowchart illustrating an example process for handling attempted access to restricted area of memory while emulating a program in a sandbox.

FIG. 3 is a flowchart illustrating an example process 300 for handling accesses to restricted areas of memory while emulating a program in a sandbox environment. The process 300 may be performed by the anti-malware system 150. In some embodiments, the anti-malware system 150 performs operations of process 300 in parallel, in different orders, or perform different steps. For example, although not depicted in process 300, the anti-malware system 150 may save the context of emulation before determining 340 whether the suspicious program is containable and restore the saved context after determining the program is containable.

The anti-malware system 150 monitors 310 the emulation of a suspicious program in a sandbox environment 310. As described with respect to FIG. 2, the anti-malware system 150 may monitor the emulation by monitoring the value of an instruction pointer that points to each instruction of the suspicious program as the instruction is executed. The anti-malware system 150 determines 320 that the suspicious program is attempting to access a restricted area of memory. The anti-malware system 150 may determine that the instruction pointer is pointing to an address in stack memory. The anti-malware system 150 pauses 330 the emulation of the suspicious program, determining 340 whether it is safe to continue emulation of the suspicious program. For example, the anti-malware system 150 can determine whether the suspicious program is containable before resuming 350 emulation of the suspicious program or shutting down 360 the emulation.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer readable medium comprising stored instructions, the instructions, when executed by a computing system, causing the computing system to perform operations comprising:
   monitoring emulation of a suspicious program in a sandbox environment hosted by a computing device, including monitoring a value of an instruction pointer, which indicates an address of a register storing an emulated instruction of the suspicious program that is a current instruction being executed;
   determining, based on the address of the register indicated by the instruction pointer, that the suspicious program is attempting to access an executable instruction stored in a stack memory of the sandbox environment;
   pausing the emulation of the suspicious program;
   saving context of the emulation of the suspicious program;
   determining validity of the address of the register indicated by the instruction pointer;
   determining if content of the register at the address is an executable instruction by disassemble a portion of bytes of the instruction to determine that the disassembled portion has a structure of an executable instruction;
   determining whether the suspicious program is containable using one or more safeguards, wherein each safeguard determines whether continued emulation of the suspicious program will cause an event to occur from which the computing device hosting the sandbox environment cannot be protected; and
   responsive to determining that the suspicious program is containable using the one or more safeguard;
   restoring the stored context; and
   resuming the emulation of the suspicious program that is attempting to access the executable instruction stored at the stack memory of the sandbox environment, wherein the suspicious program is allowed to access the stack memory of the sandbox environment.

2. The non-transitory computer readable medium of claim 1, wherein the executable instruction is an x86 assembly instruction.

3. The non-transitory computer readable medium of claim 1, wherein the context of the emulation of the suspicious program includes one or more of a state of a sandbox memory, the stack memory of the sandbox environment, or a plurality of registers of the sandbox environment.

4. The non-transitory computer readable medium of claim 1, wherein the instructions further comprise instructions that when executed by the computing system cause the computing system to:
   responsive to a determination that the suspicious program is not containable using the one or more safeguards, exit the sandbox environment to stop the emulation of the suspicious program.

5. The non-transitory computer readable medium of claim 1, wherein the one or more safeguards do not modify the suspicious program.

6. The non-transitory computer readable medium of claim 1, wherein the operations further comprise:
   monitoring execution of program codes of the suspicious program using a sandbox emulator.

7. The non-transitory computer readable medium of claim 1, wherein the operations further comprise:

disassembling a portion of bytes of the executable instruction; and determining a structure of the disassembled executable instruction.

8. The non-transitory computer readable medium of claim 1, wherein the operations further comprise:

determining a validity of a memory address that the suspicious program is attempting to access.

9. A method comprising:

monitoring emulation of a suspicious program in a sandbox environment hosted by a computing device, including monitoring a value of an instruction pointer, which indicates an address of a register storing an emulated instruction of the suspicious program that is a current instruction being executed;

determining, based on the address of the register indicated by the instruction pointer, that the suspicious program is attempting to access an executable instruction stored in a stack memory of the sandbox environment;

pausing the emulation of the suspicious program;

saving context of the emulation of the suspicious program;

determining validity of the address of the register indicated by the instruction pointer;

determining if content of the register at the address is an executable instruction by disassemble a portion of bytes of the instruction to determine that the disassembled portion has a structure of an executable instruction;

determining whether the suspicious program is containable using one or more safeguards, wherein each safeguard determines whether the suspicious program will cause an event to occur from which the computing device hosting the sandbox environment cannot be protected; and responsive to determining that the suspicious program is containable using the one or more safeguards, restoring the stored context; and resuming the emulation of the suspicious program that is attempting to access the executable instruction stored at the stack memory of the sandbox environment, wherein the suspicious program is allowed to access the stack memory of the sandbox environment.

10. The method of claim 9, wherein determining that the suspicious program is attempting to access the stack memory of the sandbox environment comprises determining that a value of an instruction pointer indicates an address at the stack memory of the sandbox environment.

11. The method of claim 9, wherein the executable instruction is an x86 assembly instruction.

12. The method of claim 9, wherein the context of the emulation of the suspicious program comprises one or more of a state of a sandbox memory, the stack memory of the sandbox environment, or a plurality of registers of the sandbox environment.

13. The method of claim 9, further comprising, responsive to a determination that the suspicious program is not containable using the one or more safeguards, exiting the sandbox environment to stop the emulation of the suspicious program.

14. The method of claim 9, wherein monitoring emulation of a suspicious program in a sandbox environment hosted by a computing device comprises monitoring execution of program codes of the suspicious program using a sandbox emulator.

15. The method of claim 9, further comprising:

disassembling a portion of bytes of the executable instruction; and determining a structure of the disassembled executable instruction.

16. The method of claim 9, further comprising:

determining a validity of a memory address that the suspicious program is attempting to access.

17. A computer system comprising:

at least one processor; and a non-transitory computer readable medium comprising stored instructions, the instructions when executed by the at least one processor cause the at least one processor to:

monitor emulation of a suspicious program in a sandbox environment hosted by a computing device, including monitoring a value of an instruction pointer, which indicates an address of a register storing an emulated instruction of the suspicious program that is a current instruction being executed;

determine, based on the address of the register indicated by the instruction pointer, that the suspicious program is attempting to access an executable instruction stored in a stack memory of the sandbox environment;

pause the emulation of the suspicious program;

save context of the emulation of the suspicious program; and determine validity of the address of the register indicated by the instruction pointer;

determine if content of the register at the address is an executable instruction by disassemble a portion of bytes of the instruction to determine that the disassembled portion has a structure of an executable instruction;

determine whether the suspicious program is containable using one or more safeguards, wherein each safeguard determines whether the suspicious program will cause an event to occur from which the computing device hosting the sandbox environment cannot be protected; and responsive to determining that the suspicious program is containable using the one or more safeguards, restore the stored context; and resume the emulation of the suspicious program that is attempting to access the executable instruction stored at the stack memory of the sandbox environment, wherein the suspicious program is allowed to access the stack memory of the sandbox environment.

18. The computer system of claim 17, wherein the instructions for monitoring emulation of a suspicious program in a sandbox environment hosted by a computing device further comprise instructions that when executed by the computing system cause the computing system to:

monitor execution of program codes of the suspicious program using a sandbox emulator.

19. The computer system of claim 17, wherein the instructions further comprise instructions that when executed by the computing system cause the computing system to:

disassemble a portion of bytes of the executable instruction; and determine a structure of the disassembled executable instruction.

20. The computer system of claim 17, wherein the instructions further comprise instructions that when executed by the computing system cause the computing system to:

determine a validity of a memory address that the suspicious program is attempting to access.

\* \* \* \* \*